United States Patent [19]
Chang et al.
[11] 3,840,864
[45] Oct. 8, 1974

[54] MULTIPLE MEMORY UNIT CONTROLLER

[75] Inventors: Hoy Ying Chang, Plymouth; Sohan L. Aggarwal, Westland, both of Mich.

[73] Assignee: Burroughs Corporation, Detroit, Mich.

[22] Filed: Jan. 14, 1974

[21] Appl. No.: 433,227

Related U.S. Application Data

[63] Continuation-in-part of Ser. No. 194,269, Nov. 1, 1971.

[52] U.S. Cl. ............ 340/172.5
[51] Int. Cl. ............ G06f 13/00
[58] Field of Search ............ 340/172.5, 146.2

[56] References Cited

UNITED STATES PATENTS

| | | | |
|---|---|---|---|
| 3,355,718 | 11/1967 | Talarczyk | 340/172.5 |
| 3,440,615 | 4/1969 | Carter | 340/172.5 |
| 3,521,240 | 7/1970 | Bahrs et al. | 340/172.5 |
| 3,553,653 | 1/1971 | Krock | 340/172.5 |
| 3,562,719 | 2/1971 | Hynes et al. | 340/172.5 |
| 3,564,513 | 2/1971 | Hibner | 340/172.5 |
| 3,576,533 | 4/1971 | Yokoyama | 340/146.2 |
| 3,702,010 | 10/1972 | Schmidt | 340/172.5 X |

*Primary Examiner*—Harvey E. Springborn
*Attorney, Agent, or Firm*—Michael B. McMurry; Edwin W. Uren; Edward G. Fiorito

[57] ABSTRACT

A memory control unit for determining the actual physical location of an instruction address in one of a plurality of memory units in a digital computer wherein the instruction address and the memory addresses are both in a block, track and word hierarchy, where the instruction address may not correspond to the memory address due to differences in the number of available blocks for recording program instructions from memory unit to memory unit, utilizing: a block address register for storing the block portion of the instruction address; a shift register associated with each memory unit wherein the number of available blocks for each memory unit is stored; a flip flop for bit by bit comparison of the contents of the block address register with the contents of selected shift registers; a counter for shifting from one to another of the shift registers when the contents of the block register exceeds the contents of the selected shift register, and an adder for decrementing the contents of the block address register by an amount equal to the number contained in the previously selected shift register. The memory control unit also includes another flip flop responding to the bit by bit serial comparison of the block address register and the selected shift register for detecting whether the instruction address starts in the last available block in a memory unit, and a circuit for evaluating the track and word portion of the address of each word of the instruction being executed for determining when the last word of an instruction has been executed by the computer.

9 Claims, 9 Drawing Figures

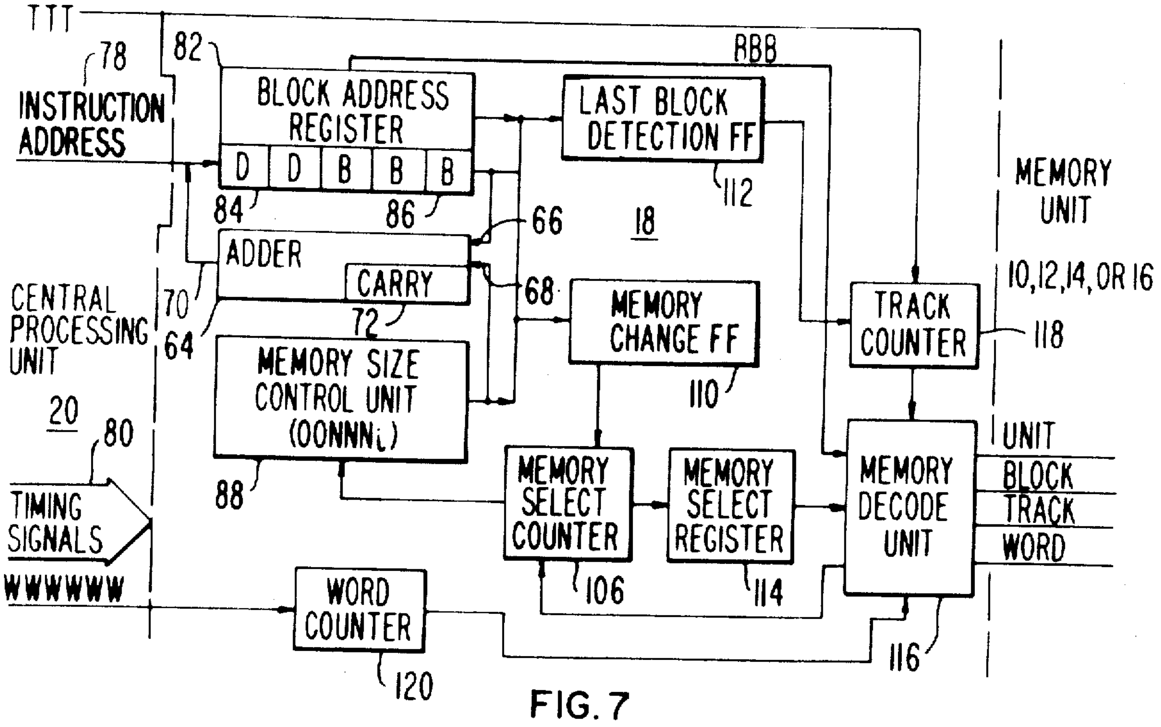
FIG. 7
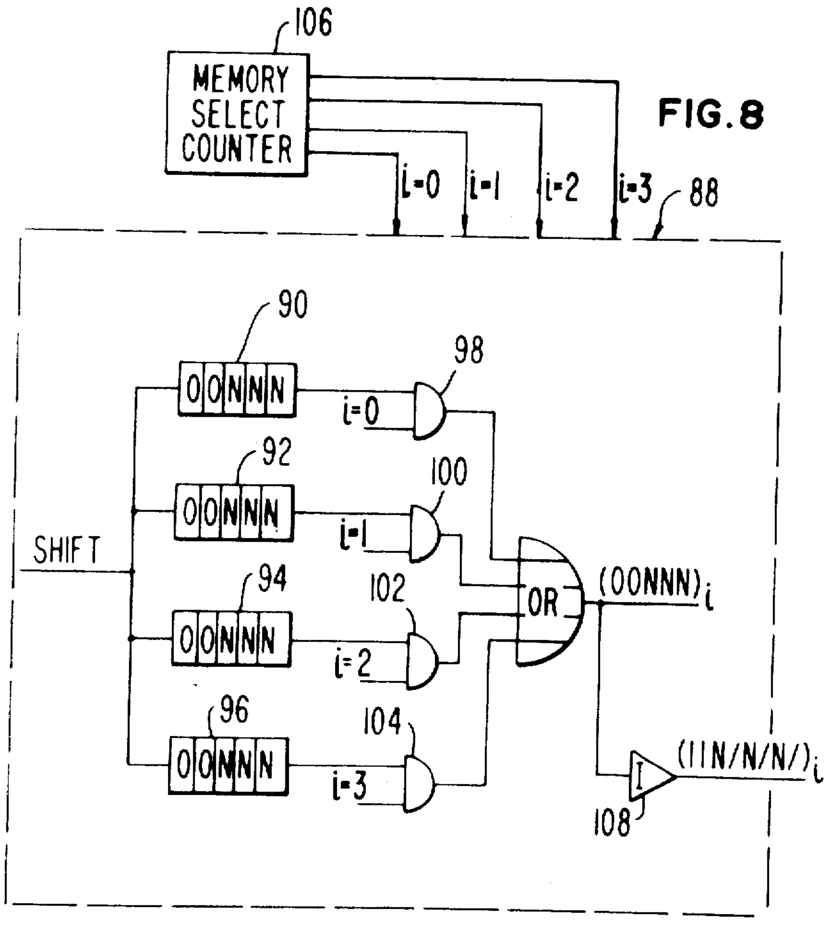
FIG. 8
FIG. 9
| BLOCK | N | N | N |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

MULTIPLE MEMORY UNIT CONTROLLER

CROSS-REFERENCE TO RELATED APPLICATIONS

This is a continuation-in-part of the application Ser. No. 194,269 filed by applicants on Nov. 1, 1971.

FIELD OF THE INVENTION

This invention relates to data processing computing systems having a plurality of addressable memory units connected thereto and in particular to a system and a method for locating and addressing a particular memory location in one of the memory units corresponding to an instruction address.

BACKGROUND OF THE INVENTION

It is desirable to be able to add memory to a computer system without having to change the programs in response to the new memory configuration. However, in many computers the instruction addresses of programs, especially microprograms, correspond directly to the physical locations of those instruction in memory. What is required, therefore, is a means of accessing any particular instruction where the instruction addresses do not necessarily correspond to the physical locations of the instructions in memory. In other words what is needed is a device to make the physical boundaries of each individual memory unit transparent to the program being run on the computer.

An example of a computer system to which it would be desirable to attach additional memory units is disclosed in U.S. Pat. No. 3,579,192 entitled Data Processing Machine which is assigned to the same assignee. The computer system disclosed in this patent has a single rotating disk memory wherein the instruction addresses of the microprograms correspond directly to the physical location of those instructions on the disc memory. However, in adding additional memory to this system two problems arise, the first of which concerns the selection of the disc memory unit containing the desired instruction where the instruction address is only indicated by a block, track, and word addressing scheme. Since the number of available blocks (blocks available for storing microprograms) may not be the same for each additional disc memory unit attached to the system, the block portion of the instruction address would not automatically correspond to a particular memory unit. Therefore it is necessary to be able to determine from the block portion of the instruction address the actual physical memory unit and the available block on that memory unit in which the instruction resides.

The second problem posed by attaching additional memory units occurs when an instruction is being executed and the length of the instructions extend beyond the last available block of a particular disk memory unit. What is needed here is a means of automatically switching to the memory unit having the next available block so that the computer may continue to execute that particular instruction without interruption.

By solving these problems, it would be possible to write programs for a particular class of computers without regard to the actual physical memory combination of each individual computer system; thereby making it economic to write a library of programs for the class as a whole.

SUMMARY OF THE INVENTION

It is an object of this invention to provide for the interconnection of supplementary memory units to a central processing unit of a computer without the necessity of changing the instruction addresses in a computer program.

It is a further object to permit the interconnection of memory units having differing numbers of available blocks without the necessity of changing the instruction addresses in programs to be run on the computer system.

It is an additional object to provide for the automatic selection of the first available block on the particular memory unit containing the remaining portion of an instruction being executed when the instruction extends past the last available block on the prior memory unit thereby making the physical boundaries of each individual memory unit transparent to the program being run in the computer.

In accordance with the above objects a memory control unit is provided for use in a digital computer system having a plurality of memory units wherein each memory location in the memory units is identified by an address in a block, track and word hierarchy, each memory unit being divided into blocks, each block into tracks and each track containing a plurality of words. The block portion of the address of an instruction to be executed will be cumulative as to successive available blocks in the memory units. The location of the first word of each instruction to be executed will, therefore, be identified by an address having block, track and word portions. An individual instruction will usually consist of more than one word and as a result may extend beyond the block in which it starts and in some cases extend beyond the memory unit in which it starts.

The blocks used for storing instructions are referred to as available blocks and the number of available blocks in the memory units may vary from memory unit to memory unit. However, the number of available blocks in each memory unit is fixed at the time when a program is loaded and this fixed number is utilized in locating the block containing the first word of the desired instruction. The block portion of an instruction address will correspond to the cumulative total of successive available blocks in successive memory units thereby serving to indicate in which available block the first word of the instruction resides.

One of the primary functions of the memory control unit is to determine the location of the starting point of a desired instruction in one of the plurality of memory units. Since the instruction may extend beyond the block in which the first word is located, the memory control unit also has the function of determining when the instruction extends into the next available block and to shift to that block at the proper time. If the first word of an instruction is in the last block of a memory unit and the instruction extends into the next available block, it is a function of the control unit to identify this situation and to shift from one memory unit to the next at the proper time.

The memory control unit includes a block address register for storing the block portion of the desired instruction address. The memory control unit also includes a plurality of shift registers wherein each shift register stores a number representing the number of available blocks in a particular memory unit. In addition a memory change flip flop is included for bit by bit comparison of the contents of the block address register with the contents of a selected shift register. The shift registers are selected in the successive order in which the program has been loaded into their respective memory units. The state of the memory change flip flop after the bit by bit comparison indicates whether the desired instruction starts within the memory unit that corresponds to the selected shift register. There is also an adder for decrementing the contents of the block address register, by means of complementary binary additions, when it is indicated by the memory change flip flop that the instruction is not in the memory unit corresponding to the selected shift register. In order to shift successively from one to another of the plurality of shift registers a memory select counter is provided that will respond to the state of the memory change flip flop and select the next successive shift register.

The memory control unit also includes means for selecting the next memory unit having an available block when an instruction that is being executed by the computer extends beyond the memory unit that contains the starting word of the instruction. Included is a last block detection flip flop that responds to the bit by bit serial comparison of the block address register and the selected shift register. The state of this flip flop will indicate whether the desired address is on the last available block of the memory unit. Additional circuit means are provided for evaluating the track and word portion of the address of each word of the instruction being executed for determining whether the last word of the instruction has been executed by the computer.

DESCRIPTION OF THE DRAWINGS

In the drawings:

FIG. 7 is a block diagram of the memory control unit of FIG. 1;

FIG. 8 is a schematic of the memory size control unit shown in FIG. 7; and

FIG. 9 is a table illustrating the shift register contents in the memory size control unit of FIG. 8 corresponding to varying numbers of available blocks.

DETAILED DESCRIPTION — SYSTEM

The preferred embodiment of this system has been developed to enable the computer system to locate the actual physical location on one of a plurality of successively addressed memory units of the first word of a computer instruction. It also enables the computer system to complete the reading of the instruction even though the instruction extends beyond the block of memory in which the first word is resident and in the further case where the original block is the last available block in the individual memory unit and the instruction extends into the next memory unit. Each program is comprised of a plurality of computer instructions wherein the starting point of each instruction in a memory unit is indicated by an instruction address. Since the same program may operate on different computers having differing memory configurations, the instruction addresses often do not correspond directly to physical locations in the memory. Also, for purposes of the preferred embodiment, no computer instruction will be more than one block in length.

Figures 1, 2, 3:
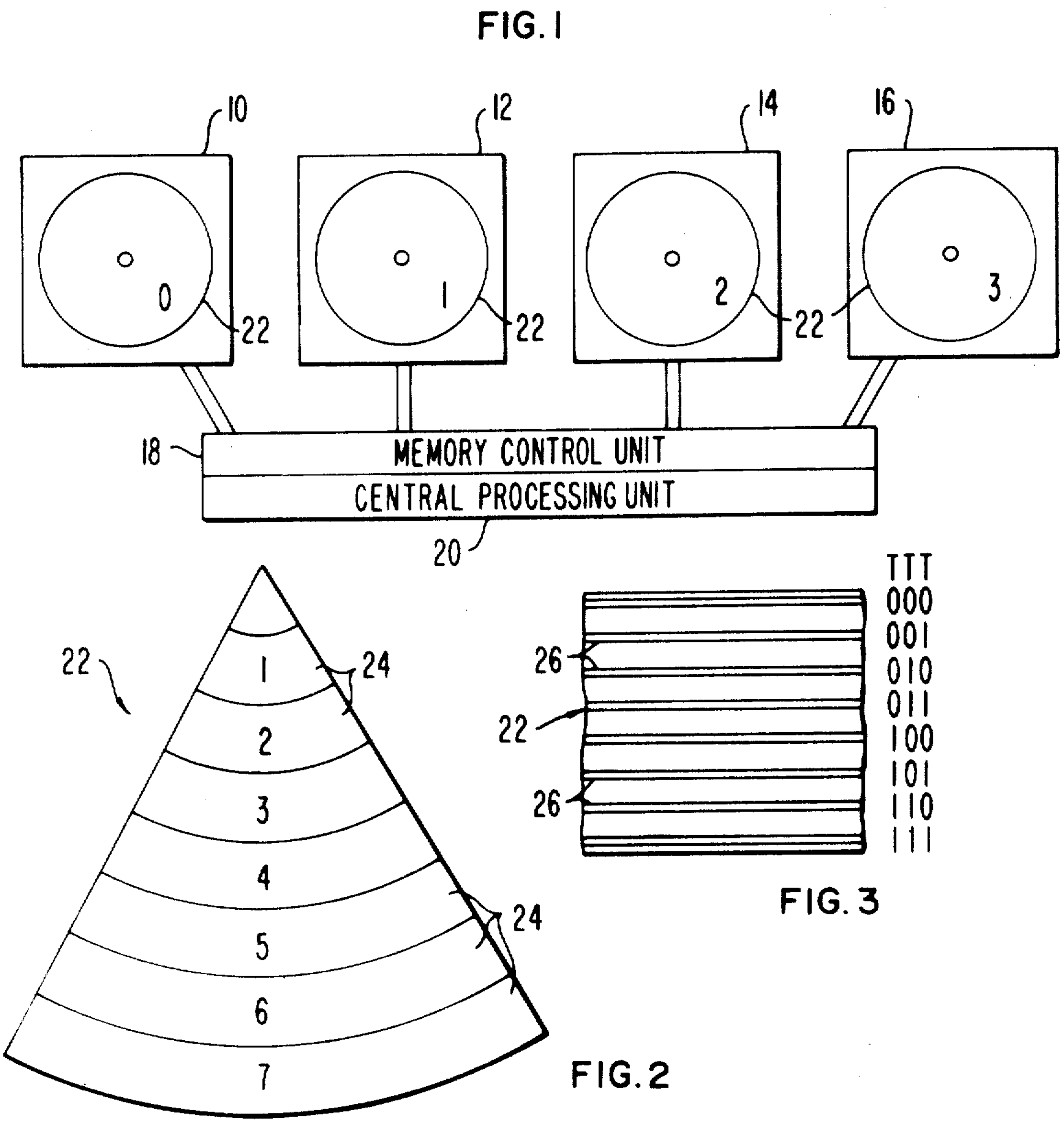
FIG. 1 is a block diagram illustrating a portion of a computing system having a plurality of memories operatively connected to a central processing unit.
FIG. 2 illustrates the block portions of a magnetic disc in the preferred embodiment.
FIG. 3 illustrates the track portion of a block of FIG. 2.

Referring to the Figures by the characters of reference, there is illustrated in FIG. 1 a plurality of memory units 10, 12, 14 and 16 operatively coupled through a memory control unit 18 to a central processor 20 of a computer. The first memory unit 10, labeled zero, represents the memory unit which may be physically located in a central processing unit of a computer. An example of such a computer having this type of disc memory is disclosed in U.S. Pat. No. 3,579,192 entitled Data Processing Machine, which is assigned to the same assignee. The other three memory units 12, 14 and 16, labeled one, two and three, are used as supplementary memories in order to expand the memory capacity of the computer. In the system of FIG. 1, it is a desirable feature that the central processing unit 20 be able to operate with memory units 10, 12, 14 and 16 each having a different number of available blocks. Additionally, it is a desirable feature of the system of FIG. 1 that a program be operable with the central processing unit regardless of the number of memory units of the system and the number of available blocks on each individual memory unit. Naturally, the length of a program must not exceed the total number of available blocks on the system. It is, therefore, one of the ultimate objectives of this invention to make the physical boundaries of each memory unit transparent to any program executed by central processing unit 20. As will hereinafter become apparent, each of the supplementing memory units 12, 14 and 16 may be added to or removed from the system without the necessity of making changes to the program or instruction addresses. It should be remembered, however, that if the number of available blocks in any memory unit is changed, or a memory unit is removed or added, it is of course necessary to reload the program, i.e., to write the program instruction on to the revised memory unit structure and to record the new number of available blocks in the memory control unit shift registers as discussed in connection with FIG. 8.

In accordance with the aforementioned objects and the preferred structural embodiment it will hereinafter become apparent to those in the art that, based upon the embodiment employing several disc memory units, we provide logic for determining in which memory unit and on which available block on that memory unit 10, 12, 14 and 16, a given instruction is started. Each program that is to be run on the computer 20 consists of a plurality of computer instructions that are contained in the computer memory units 10, 12, 14 and 16. During execution of the program location of individual instructions is accomplished by means of instruction addresses, wherein the instruction address indicates the location of a first word 28 of the computer instruction as contained in tracks 26 of the memory units. The instruction address of the program utilizes a hierarchy consisting of block, track and word portions, which corresponds to the actual physical addressing scheme of the memory units. However, due to the fact that there may be a differing number of available blocks on each memory unit in the preferred embodiment, it is necessary to find the actual physical block on each memory unit that corresponds to the instruction address when a desired instruction is being sought during execution.

A memory control unit 18 is provided, which memory control unit maintains in registers a count of the actual number of blocks 24 which are available (90, 92, 94, 96) for each memory unit connected to the computer. Blocks which are "available" will be understood to be the actual number of blocks on a memory unit that are available to store a program.

In operation, the memory control unit 18 first compares the block portion of the instruction address with the number of available blocks in the first memory unit 10. If the number of available blocks is less than the block portion of the instruction address, the number of available blocks will be subtracted from the block portion of the instruction address and this new block portion compared with the number of available blocks in the next memory unit 12, 14 or 16. Through these comparisons, the memory unit containing the desired block is determined.

Once the memory unit is selected, the block portion of the instruction address is then compared with the number of available blocks in the selected memory unit to determine whether or not the desired block containing the instruction is the last available block contained in the memory unit. Since the computer instruction at that address may be several words 28 or tracks 26 in length, it may be necessary to cross the memory unit's boundary lines during execution of the instruction by the computer if the instruction starts on the last available block. Therefore, during the execution of each word 28 of the instruction, a test is performed to determine if the instruction has been completely executed. If, as a result of the testing of the track and word portions of the address of the particular word of the instruction being executed indicate that the instruction extends beyond the original block selected, the next memory unit will be selected and tested to determine whether or not an available block of memory is located thereon. When the next available block of memory is located, the execution of the instruction continues to completion.

Figure 4:
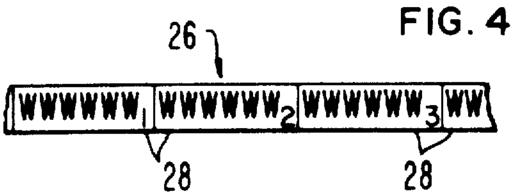
FIG. 4 illustrates the word portion of a track of FIG. 3.

In FIGS. 2, 3 and 4 there is illustrated, in graphic form, the layout of a preferred embodiment of each of the memory units 10, 12, 14 or 16. In each case, the memories are preferably rotating magnetic discs 22 where FIG. 2 represents a sector of one of the discs illustrating the division of the disc into blocks 24. As illustrated in FIG. 2, there are, for example, seven physical blocks 24 of memory on each disc 22 with the blocks identified as 1, 2, 3, 4, 5, 6 and 7. Each disc or memory unit may have any number of active blocks wherein an available block is defined as a physical block available for storing a program instruction. All available blocks are contiguous to one another beginning with the inside block or block 1, and likewise all unavailable blocks, i.e., those that are not available for storing program instructions, are contiguous beginning with the outside block or block 7.

In FIG. 3, there is illustrated the number of individual tracks 26 per block and as shown in FIG. 3, the tracks are numbered from 000 the innermost track to 111 the outermost track of a block 24 which are the binary equivalents of tracks zero through track seven. Thus, on any disc 22 there are physically seven blocks 24 of eight tracks 26 each or 56 tracks of information on a given disc. FIG. 4 represents a portion of a track illustrating the division of a track 26 into words 28 of convenient length. Each word 28 is addressed by a six bit binary number as illustrated in FIG. 4. Thus, in the preferred embodiment there are 56 tracks per disc of 64 words per track or 3,584 words on each physical disc.

In the preferred embodiment, the memory units 10, 12, 14 and 16 used are magnetic discs 22 operating asynchronously. However, the disclosed process is independent of the type of memory unit as long as the memory unit has a configuration wherein the addressing is similar to that illustrated herein, i.e., block, track and word. Examples of the different types of memories which may be used may be core memories, drum memories operating synchronously or asynchronously, magnetic disc memories operating synchronously, etc.

For each instruction contained in the program, there is an instruction address that specifies the relative starting location of the instruction in memory comprising the following format:

Block = D D B B B

Track = T T T

Word = W W W W W W wherein the block, track and word portions of the instruction addresses are five, three and six bit binary numbers, respectively. For each instruction address the actual physical memory unit that contains the instruction must be located. This determination must also indicate whether or not the instruction address falls in the last available block of the memory unit so identified. This is done so that if the program instruction overflows the identified memory unit, a memory unit transistion can autoamtically be made that will be transparent to the program being executed. In the preferred embodiment since each instruction is not longer than one block, only one last-block-test need be performed.

Figures 5, 6:
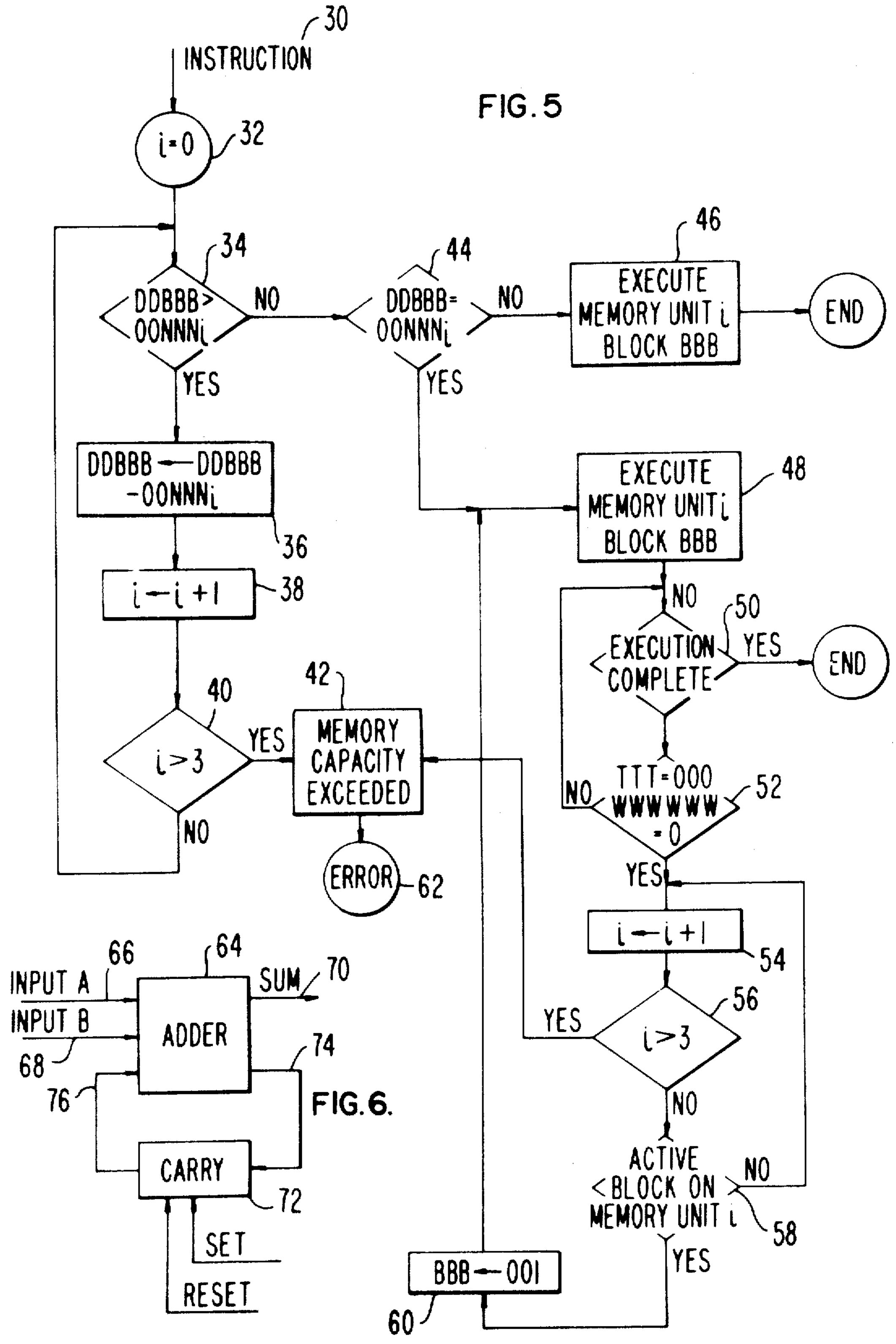
FIG. 5 is a flow chart illustrating the logic of the method of addressing the proper available block in response to an instruction address utilized by memory control unit of FIG. 1.
FIG. 6 is a schematic of an adder used in one of the steps of the method of FIG. 5.

Referring to FIG. 5 there is illustrated the logic of the memory control unit 22 for locating the actual physical disc block upon which an instruction resides. For the purposes of this disclosure the sbuscript *i* indicates the disc number and has a value determined by the number of the physical units which in this embodiment will be from zero to three. The binary expression $00NNN_i$ represents the number of available blocks 24 on each disc *i* and will have a binary value from zero to an including seven.

The logic of the memory unit controller, as illustrated by the flow chart in FIG. 5, starts with a request to find an instruction, step 30, and begins at disc zero which is indicated by the encircled step 32 labeled $i=0$. In the next step 34, the block address poriton DDBBB of the instruction address defining the starting location of the instruction is compared to $00NNN_0$ and if the address DDBBB is greater than $00NNN_0$, the memory controller proceeds to the next functional step 36. In this step 36 the block portion of the address, namely DDBBB, is decremented by $00NNN_0$. In the next step 38, $i$ is incremented by one and the memory controller proceeds to the succeeding step 40 where $i$ is tested to see if it is greater than three which represents the largest disc number in the memory system. If $i$ is greater than three, this indicates that the instruction address being looked for exceeds the "available" memory capacity of the system and therefore is not within the memory system of the computer as shown in step 42. If $i$ is not greater than three, the above described steps 34–40 of the memory control logic are repeated until a decremented number DDBBB is found that is no greater than the number of avaialble blocks in disc $i$. At this time, the memory controller then proceeds to the next step 44 wherein the address portion DDBBB is checked for equality with $00NNN_i$. Equality indicates that the instruction begins on the last available block 24 of disc $i$.

If it is determined that the instruction is not on the last available block of disc $i$, the memory controller proceeds to the functional step 46 wherein the instruction is executed by the computer.

If it is determined that the instruction begins on the last available block of the disc $i$, the logic proceeds to the functional step 48 wherein execution of the instruction is begun by the computer. If execution of the instruction ends without exceeding the last available block on disc $i$, the operation of the Memory Control Unit ends as indicated in step 50. As each word of the instruction is being executed by the computer, the track and word portions of the address are tested in step 52. Each instruction is made up of a plurality of words each of which is executed in sequence by the central processing unit 20, during which time a count is maintained by the central processing unit 20 of the track and word portion of the address of the particular word in the instruction that is being executed.

When the track and word portion of the address of the word to be executed each equals zero, $(TTT)_1$ = 000 and $(WWWWWW)_1$ = 000000, the indication is that the instruction carries over to the next available block since the first word on a block has a track and word address at zero. Due to the fact that the instruction started on the last available block of the disc, an indication that the instruction carries on to the next avaialble block also indicates that it carries over to the next disc. In step 54, $i$ is incremented by one and in the following step 56 the result is tested for $i$ being greater than three. If $i$ is not greater than three then in the next step 58 disc $i$ is checked to see if it contains any available blocks. If not, the above steps 54, 56 and 58 are repeated until a disc with an available block is found or if the memory capacity of the system is exceeded, as indicated by $i$ becoming greater than three, the process is terminated as in step 42. When a disc with an available block is found, the BBB portion of DDBBB is replaced by 001 in the following step 50, and the execution of the instruction continues.

As an example illustrating the process set forth in FIG. 5 consider the following:

1. The system uses all four memory units 10, 12, 14 and 16, which are magnetic disc 22 in the preferred embodiment, with the following chart indicating the disc number; the number of available blocks per disc; and the $NNN_i$ of each disc.

CHART A

| DISC | BLOCKS | $NNN_i$ |
|---|---|---|
| 0 | 7 | 111 |
| 1 | 5 | 101 |
| 2 | 3 | 011 |
| 3 | 5 | 101 |

2. The address of the first word of the instruction is as follows:

| DDBBB | TTT | WWWWWW |
|---|---|---|
| 01111 | TTT | WWWWWW |

It will be understood that the block portion of the instruction address, here 01111, is a relative address and therefore independent of the actual physical locations of the available blocks in the computer's memory system. As indicated in the above instruction address and from Chart A the number of the block desired is block 15 and this block would be on the third disc or disc two. In particular, block 15 is the last available block of disc two.

Referring to the flow chart, in the first step 34 the block portion, DDBBB of the instruction address is compared with $00NNN_i$ which indicates the number of available blocks on disc zero. Since DDBBB (01111) is greater than $00NNN_0$ (00111) the desired block is not on this disc. The memory controller therefore proceeds to the next functional step 36 where 00111 is subtracted from 01111, resulting in the decremented DDBBB being set equal to 01000. In the next step 38, $i$ is replaced by $(i+1)$. In the next step 40 $i$ is tested to see if the incremented $i$ is greater than three. Since $i$ is equal to one the memory controller returns to the first step 34.

The decremented DDBBB (01000) is compared with $00NNN_i$ of disc one. Since DDBBB (01000) is greater than $00NNN_1$ (00101), the memory controller proceeds to the next two functional steps 36 and 38, wherein 00101 is subtracted from 01000 resulting in the decremented DDBBB being equal to 00011. Again $i$ is incremented making it equal to two and is tested and found to be less than three; therefore, the logic returns to the first step 34. Once again the value of the decrementd DDBBB (00011) is compared with the value of $00NNN_i$ for disc two and is found not to be greater than $00NNN_2$ (00011). The memory controller proceeds to the next step 44 where the value of the decremented DDBBB is tested for equality with $00NNN_i$. Here the value of the decremented value of DDBBB (00011) is equal to $00NNN_2$ (00011) indicating that the instruction starts in the last available block of disc two. At this point, the remaining portion of the address is used, namely TTT and WWWWWW to locate the exact position of the first word of the instruction on disc two.

At the end of the execution of each word of the instruction, the instruction is tested, i.e., step 50, to determine if it has been completely executed. If it has, the process is completed. If it has not been completed, the track and word portion of the address are tested at the next step 52. If both the track and word portion of the instruction address are equal to zero, the last track on the block has been exceeded as previously explained. Since in step 44 equlaity has been determined, indicating that the instruction starts in the last block, *i* will be increased from two to three in step 54. Again *i* is tested 56 to see if it is greater than three and at step 58 the new memory unit is tested to determine if there are available blocks thereon. If not, the two previous steps 54 and 56 are again repeated. However, since in this case there are available blocks on disc three, BBB will be replaced by 001 as per step 50 and the computer will continue to execute the instruction contained in the first block, first track of disc three. At this point the function of the memory control unit 18 has been completed.

In step 36 the memory controller logic where DDBBB is replaced DDBBB-00NNN$_i$, this step 36 may be performed in an adder 64 such as diagrammatically illustrated in FIG. 6 according to the following equation:

$$DDBBB \leftarrow DDBBB_{+}(11N/N/N/)_i{+}1.$$

The following Chart B illustrates the logic signals applied to the adder 64 of this step 36 in the above example.

CHART B

| DISC | INPUT A DDBBB | 00NNN | INPUT B 11N/N/N/ | SUM DDBBB+11N/N/N/+1 |
|---|---|---|---|---|
| 0 | 01111 | 00111 | 11000 | 01000 |
| 1 | 01000 | 00101 | 11010 | 00011 |
| 2 | 00011 | 00011 | 11100 | 00000 |

The operation illustrated in Chart B is performed in the adder 64 by the process of bit-serail addition. One of the numbers to be added is complemented, namely, 00NNN, and to the least significant bit position an additional one is entered into the adder 64 by setting a carry 72. In the following Chart C, each line represents one bit position being added and the total chart represents the calculation for disc zero of Chart B. In this Chart the 00NNN is complemented and shown, bit by bit, as 11N/N/N/.

CHART C

| INPUT A DDBBB | INPUT B 11N/N/N/ | CARRY | OUTPUT SUM | CARRY |
|---|---|---|---|---|
| Initial | Condition | | | 1 |
| 1 | 0 | 1 | 0 | 1 |
| 1 | 0 | 1 | 0 | 1 |
| 1 | 0 | 1 | 0 | 1 |
| 1 | 1 | 1 | 1 | 1 |
| 0 | 1 | 1 | 0 | 1 |

The carry column represents the value of the output carry 74 from the previous line. The answer is found in the sum column reading as follows 01000. This operation in effect performs a subtraction of two binary numbers by the process of addition and can be performed in the adder 64 of FIG. 6 having the following truth table.

TRUTH TABLE

| INPUT | | | OUTPUT | |
|---|---|---|---|---|
| A | B | Previous Carry | Sum | Carry |
| 0 | 0 | 0 | 0 | 0 |
| 0 | 0 | 1 | 1 | 0 |
| 0 | 1 | 0 | 1 | 0 |

TRUTH TABLE-Continued

| INPUT | | | OUTPUT | |
|---|---|---|---|---|
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

In the step 34 of the logic set forth in FIG. 5 where DDBBB is compared with 00NNN$_i$, each bit position of the block portion of the instruction address, DDBBB, is compared with corresponding bit position of the number 00NNN$_i$ of available blocks on each disc *i*. As each bit position is checked, a Memory Change flag or a flip flop to be described in connection with FIG. 7 is set if the instruction address bit is greater than the corresponding bit of 00NNNi and conversely the Memory Change flag is reset if the corresponding bit of 00NN$_i$ is greater than DDBBB bit. Initially, the Memory Change flag is reset indicating that the number of available blocks on the disc is larger than the block portion of the instruction address. After all five bit positions have been checked, the status of the Memory Change flag will indicate if the instruction will be found on disc *i*. The following Chart D indicates the bit by bit comparison (low order to high order) of line one of Chart B.

CHART D

| DDBBB | 00NNN | MEMORY CHANGE FLAG Set | N/C | Reset |
|---|---|---|---|---|
| Initial | Condition | | | X |
| 1 | 1 | | X | |
| 1 | 1 | | X | |
| 1 | 1 | | X | |
| 1 | 0 | X | | |
| 0 | 0 | | X | |

In Chart D and the following charts, the words set and reset indicate the state of the Memory Change flag or flip flop. The terminology N/C is an abbreviation for No-Change indicating that the flag remains in its previous state. Thus, at the end of the last line of Chart D, the Memory Change flag is in a set state thereby indicating that the instruction address is greater than the number of available blocks on the disc. In a similar manner, from line three of Chart B the following Chart E indicates that the instruction address is contained on disc two since the Memory Change flag remains in a reset condition.

CHART E

| DDBBB | 00NNN | MEMORY CHANGE FLAG Set | N/C | Reset |
|---|---|---|---|---|
| Initial | Condition | | | X |
| 1 | 1 | | X | |
| 1 | 1 | | X | |
| 0 | 0 | | X | |
| 0 | 0 | | X | |
| 0 | 0 | | X | |

At the conclusion of the last line, the Memory Change flag remains reset indicating that DDBBB is not greater than 00NNN.

In the step 44 of the memory control unit logic where decremented DDBBB is tested for equality with $00NNN_i$, a Last Block Detection flag or flip flop, to be described in connection with FIG. 7, will be set or reset according to the characteristics of each bit position. This flag will be initially set to indicate equality and will be reset if a bit position in either term is larger than the corresponding bit position in the other term. If the Last Block Detection flag is in a set condition, the two numbers are equal and conversely if in a reset condition then the two numbers are unequal. The following Chart F illustrates the test as if it were performed on line one of Chart B.

CHART F

| DDBBB | 00NNN | LAST BLOCK DETECTION FLAG |
|---|---|---|
| Initial | Condition | Set |
| 1 | 1 | N/C |
| 1 | 1 | N/C |
| 1 | 1 | N/C |
| 1 | 0 | Reset |
| 0 | 0 | N/C |

At the conclusion of the last line, the flag is in a reset condition indicating that the terms are not equal.

When the process reaches the equality step 44 in line three of Chart B, the following Chart G is derived:

CHART G

| DDBBB | 00NNN | LAST BLOCK DETECTION FLAG |
|---|---|---|
| Initial | Condition | Set |
| 1 | 1 | N/C |
| 1 | 1 | N/C |
| 0 | 0 | N/C |
| 0 | 0 | N/C |
| 0 | 0 | N/C |

At the conclusion of the last line, the Last Block Detection flag remains set indicating that DDBBB and $00NNN_i$ are equal. Therefore in this case the addressed block is the last available block 24 of the memory disc two.

Summary, by checking the memory change flag that corresponds to step 34, it will be known whether or not the addressed disc contains the instruction. If the addressed disc contains the instruction, then the Last Block Detection flag that corresponds to step 44 is checked to see if the instruction is in the last available block of the addressed disc. As indicated in the flow chart of FIG. 5, if the memory unit is addressing the last disc and further, if the execution of the instruction is found to begin on the last block, the logic will indicate an error 62 when the instruction extends past the last available block thereby exceeding the storage capacity of the memory system.

Operatively connected to the central processing unit 20 of FIG. 1 is the memory control unit 18 for operatively coupling the selected memory unit 10, 12, 14 and 16 to the central processor 20. In FIG. 7 there is illustrated in block diagrammatic form the organization of the memory control unit 18. The memory control unit 18 receives an instruction address 78 from the central processing unit 20 and in cooperation with timing signals 80 also from the central processing unit 20 performs the logic set forth in FIG. 5. All operations are performed in bit-serial fashion.

The memory control unit 18 comprises a block address register 82 to receive the block portion of the instruction address 78 from the central processor 20. The block address register 82 is a five stage shift register for receiving the DDBBB portion of the instruction address 78. When the transfer to the block address register 82 is complete, the contents of the register 82 are DDBBB reading from the input stage 84 the most significant bit position, to the output stage 86, the least significant bit position.

Operatively coupled to the block address register 82 is the bit serial adder 64 such as the one shown in FIG. 6. Input A, 66 of FIG. 6, of the adder is operatively connected to the output stage 86 of the block address register 82 for sequentially receiving each bit position of the information stored in the register 82. The sum output 70 of the adder 64 is operatively connected to the input stage 84 of the block address register 82. Operatively connected to the input B, 68 of FIG. 6, of the adder 64 is the memory size control unit which supplies $(11N/N/N/)_i$ to the adder 64.

In the memory size control unit 88, as illustrated in FIG. 8, each memory unit 10, 12, 14 or 16 has associated with it a separate register 90, 92, 94 and 96 respectively. These registers are in the preferred embodiment five stage shift registers which are capable of being set prior to the loading of the program to indicate the number of available blocks each memory unit. In the preferred embodiment, there is provision for up to four memory units to be coupled to the memory control unit; therefore, in the memory size control unit 88 there are four five-stage shift registers 90, 92, 94 and 96. When the memory units are coupled and uncoupled from the memory control unit 18, the contents of the associated shift register 90, 92, 94 or 96 are also changed to reflect the results of the coupling. The value contained in each shift register is 00NNN where NNN is a binary number representing the number of available blocks on the memory unit. The output of each of the shift registers is connected to one input of the respective AND gates 98, 100, 102 and 104. The other input labeled *i* on each of the gates 98, 100, 102 and 104 is connected to a memory select counter 106 to select the desired memory unit, corresponding to the logic in steps 38 and 54 of FIG. 5. The memory size control unit 88 additionally supplies the complementary signal of $00NNN_i$, namely $(11N/N/N/)_i$ from the inverter 108 to the adder 64 for the various computations in the logic of FIG. 5.

Operatively connected to both the block address register 82 and the memory size control unit 88 are the memory change flip flop 110 and the last block detection flip flop 112. As previously indicated in the discussion of the logic set forth in FIG. 5, the flip flops 110 and 112 are responsive to the bit serial content of the block address register 82 and the memory size control unit 88. The operation of the memory change flip flop 110 coincides with the explanation of the memory change flag as detailed in Charts D and E, that in turn corresponds to step 34 of FIG. 5. The operation of the last block detection flip flop 112 coincides with the explanation of the last block detection flag as detailed in Charts F and G that in turn corresponds to step 44 of FIG. 5.

When the output of the memory change flip flop 110 indicates that the block portion of the instruction address is not contained in the selected memory unit (step 34 of FIG. 5) the signal from flip flop 110 advances the counter 106 and thereby selects the next memory unit in sequence as per step 38 of FIG. 5. The output of the memory select counter 106 is transferred to a memory select register 114 as illustrated in FIG. 7 to provide signal isolation and better addressing control of memory units.

Within the memory control unit 18 of FIG. 7 there is a memory decode unit 116, a track counter 118 and a word counter 120 to operatively locate a particular word on the selected memory unit. The memory select register 114 is set to the address of the selected memory unit when, as in step 34 of FIg. 5, the Memory Control Unit 18 determines that the block portion of the instruction address is not greater than the number of available blocks of the selected memory unit. When this is determined, the memory select register 114 supplies signals to the memory decode unit 116 to address the selected memory unit. Additionally, the memory decode unit 116 receives the block address portion of the instruction from the block address register 82; namely, the BBB portion and the track portion of the instruction address from the track counter 118 and the word portion of the instruction address from the word counter 120. It is the function of the memory decode unit 116 to address the proper block and track of the selected memory unit and to indicate to the memory select counter 106 when the instruction being executed overlfows the last block of the selected memory unit as shown and described in connection with step 54 of FIG. 5. Upon receipt of the overflow signal, the memory control unit 18 then determines, in accordance with step 54 of the logic of FIG. 5, the next sequential memory unit having an available block of memory contained as previously developed therein. When the next memory unit is ascertained, the memory decode unit 116 is set to the address of the new memory unit and the BBB portion of the block portion of the instruction address in the block address register 82 is set to 001, which in effect selects the first available block in the new memory unit, as per step 60 of FIG. 5.

The memory control unit 18, as previously indicated receives its timing from the central processing unit 20 and also from the central processing unit 20 and also from the selected memory units 10, 12, 14 or 16, as is commonly done in the art, in order to process the information between the central processing unit 20 and the selected memory unit. The timing from the memory units 10, 12, 14 and 16 is received from the timing track on the memory units. Once the memory control unit 18 has selected the appropriate memory unit, data transmission between the central processing unit 20 and the selected memory unit begins. In response to the above, and in cooperation with the several individual units in the memory control unit 18, the memory control unit will automatically switch from memory unit to memory unit when during the execution of an instruction by the computer the length of the instruction exceeds the number of available blocks on the first selected memory unit.

What is claimed is:

1. In a digital computer having at least one memory unit, each said memory unit having a predetermined number of available blocks for storing instructions, wherein each location in the memory unit is identified by an address in a block, track, and word hierarchy and the instruction addresses in a program being similarly in a block, track, and word hierarchy, a memory control unit for determining the location of a desired instruction address in the memory unit comprising:

a block address register for storing the block portion of the instruction address;

a plurality of shift registers, wherein an individual shift register is associated with a said memory unit and contains information indicating the number of blocks in said associated memory unit which are available for use;

comparison means for comparing the contents of said block address register with the contents of a selected one of said shift registers;

decrementing means responsive to said comparing means for decrementing the contents of said block address register by the contents of said selected shift register when the contents of said block address register exceeds the contents of said selected shift register; and selecting means responsive to said comparing means for selecting another of said shift registers when the contents of said block register exceeds the contents of said selected shift register.

2. The memory control unit of claim 1 wherein the contents of said block address register and said plurality of registers are in binary form and wherein said comparing means is a flip flop for bit by bit serial comparison.

3. The memory control unit of claim 1 additionally including means for complementing the contents of said selected shift register.

4. The memory control unit of claim 3 wherein said decrementing means includes a binary adder for combining the contents of said block address register with the output of said complementing means.

5. The memory control unit of claim 1 additionally including last block detection means for determining when the instruction address is addressing the last available block in a memory unit.

6. The memory control unit of claim 5 wherein the contents of said block address register and said selected shift register are in binary form and wherein said last block detection means is a flip flop for bit by bit serial comparison.

7. The memory control unit of claim 5 additionally including means responsive to said last block detection means for evaluating the track and word portions of the instruction being executed to thereby determine when the last instruction word in said last available block has been executed.

8. The memory control unit of claim 7 wherein the contents of said block address register and said selected shift register are in binary form and wherein said last block detecting means is a flip flop for bit by bit serial comparison of the contents of said block address register and said selected shift register.

9. A memory control unit for use in a digital computer having a plurality of memory units wherein each memory location is identified by an address in a block, track, and word hierarchy, and, wherein instruction addresses of program instructions are similarly formatted in a block, track and word hierarchy, said memory control unit being used for determining the location of the first word of an instruction in a said memory unit, comprising:

a block address register for storing the block portion of a said instruction address;

a plurality of shift registers, wherein each shift register is associated with a memory unit and contains information indicating the number of blocks in said associated memory unit which are available for use;

a comparison flip flop responsive to the contents of said block address register and said selected shift register;

a complementing circuit which complements the contents of said selected shift register;

a binary adder responsive to the contents of said block address register and said complementing circuit for decrementing the contents of said block address register by the contents of said selected shift register;

a select counter responsive to said comparison flip flop for selecting another of said shift registers; and a last block detection flip flop responsive to the contents of said block address register and said selected shift register.

* * * * *